Nov. 5, 1929.   E. FETTER   1,734,766
TIRE VULCANIZING APPARATUS
Filed May 23, 1927   5 Sheets-Sheet 3

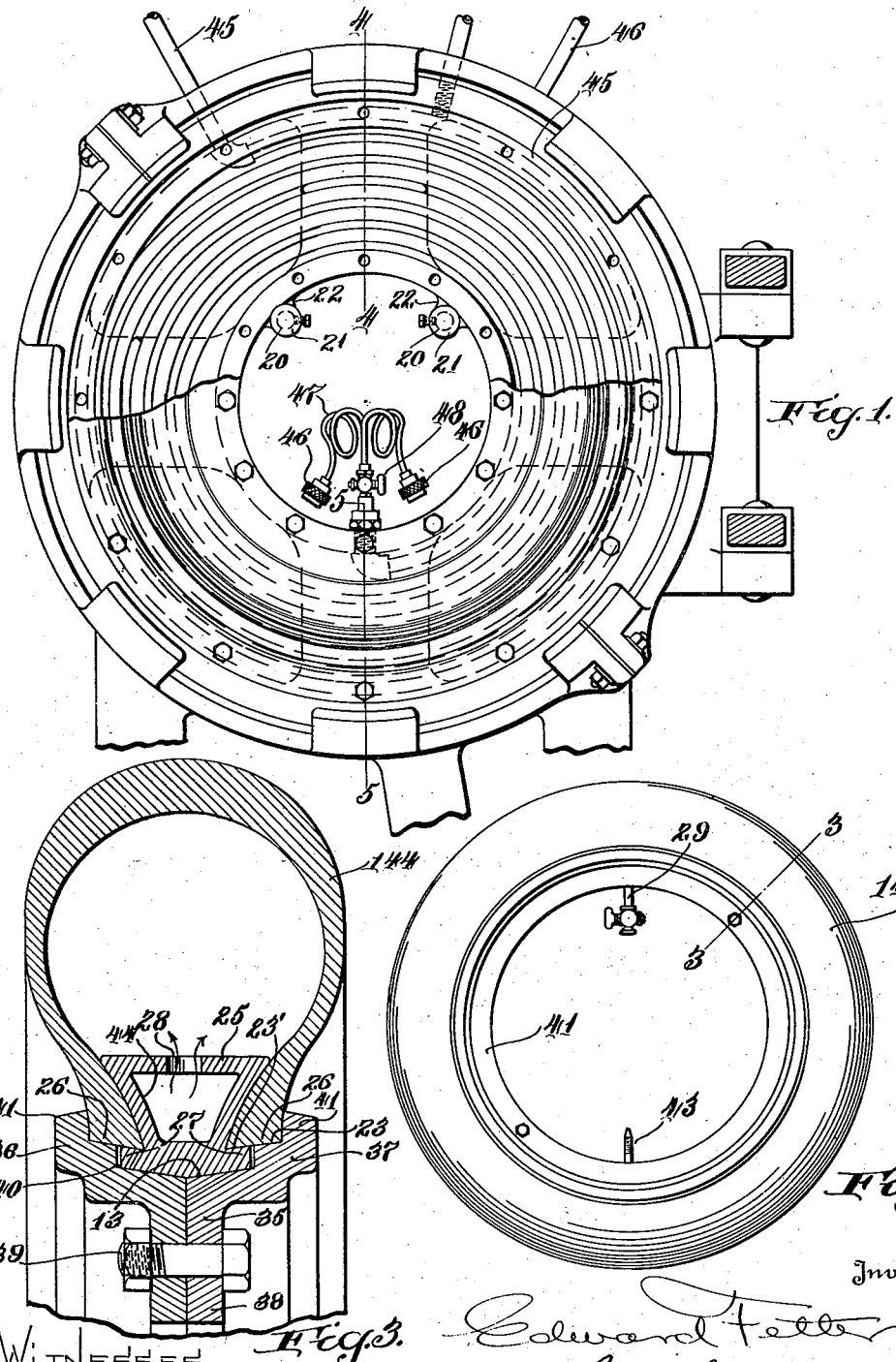

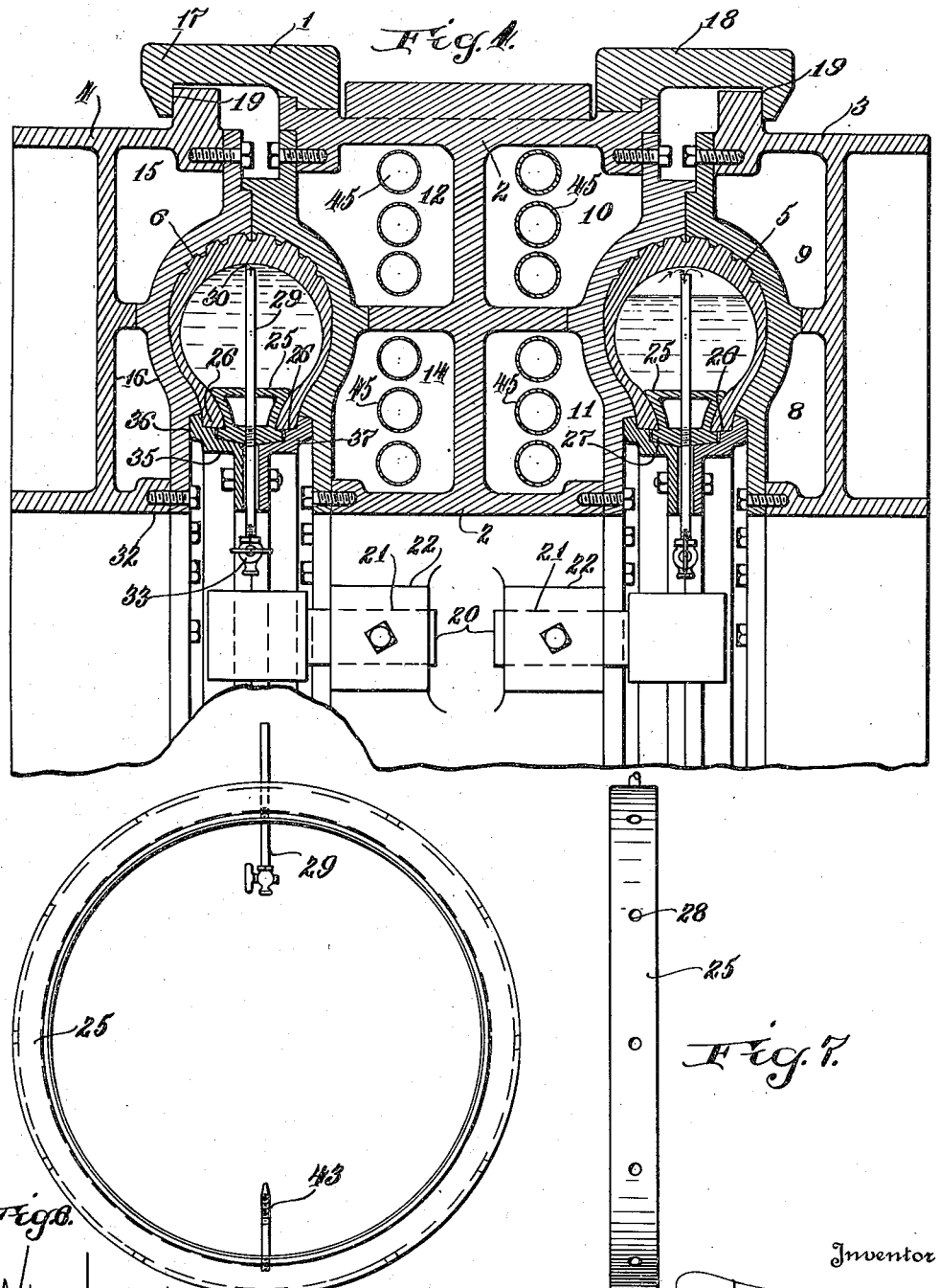

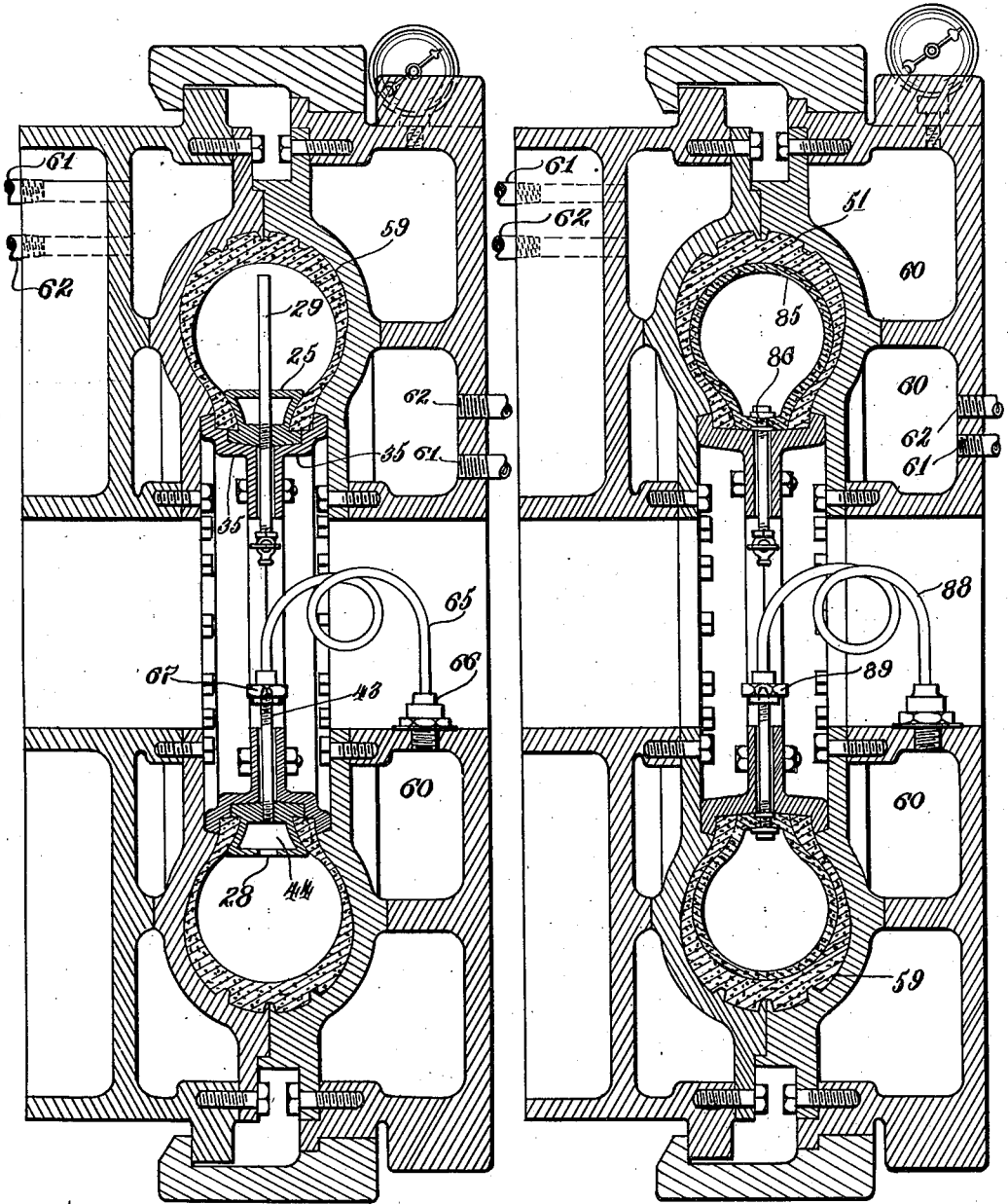

Patented Nov. 5, 1929

1,734,766

UNITED STATES PATENT OFFICE

EDWARD FETTER, OF BALTIMORE, MARYLAND

TIRE-VULCANIZING APPARATUS

Application filed May 23, 1927. Serial No. 193,409.

In the manufacture of pneumatic tires, otherwise known as shoes or casings, the shoe is first built up of fabric and unvulcanized vulcanizable rubber compound, the term fabric being used to indicate either cord fabric or other fabric used in the manufacture of tires. The casing thus formed has, in accordance with the regular practice, been placed in a vulcanizing mold or vulcanizer having a jacket surrounding the mold cavity which is filled with steam or hot water, or other heating medium, at the proper vulcanizing temperature. The casing or tire has been held in contact with the mold surface by pressure from within, a bag or other suitable flexible container being placed in the cavity within the casing and filled with any suitable medium adapted to conform to the annular cavity within the casing and to maintain a uniform pressure, keeping the outer surface of the casing in close contact with the mold surface.

In accordance with the previously existing practice the casings have been vulcanized by heating from the outside and there has been a consequent lack of uniformity as to the heating and hence the vulcanization of the thicker portions of the casing, as the tread, as compared to the side walls and thinner portions.

The present invention relates to a method and apparatus whereby tire casings or shoes are vulcanized by heating from within as well as from without, the vulcanizing temperature being applied on both the inside and the outside of the casing simultaneously. The bag may, to the best advantage, be omitted and the casing inflated from within by means of a heating medium at the necessary pressure to maintain molding contact between the walls of the mold cavity and the outer surface of the casing, the air which normally fills the annular chamber within the casing being displaced and released as the heating medium enters.

The heating medium thus used to obtain the desired pressure and temperature inside the casing may be either hot water or other liquid under pressure which is preferably heated by means of a coil within the mold jacket and led from the coil into the inside of the casing in a manner to be described, or in any suitable manner, or, it being assumed that the vulcanizer jackets are filled with steam at the desired temperature, which would give a live steam pressure too low for this purpose, the vulcanizing temperature and the necessary pressure may be applied to the inside of the casing by means of this steam mixed with air to raise it to the necessary pressure to accomplish satisfactory molding of the outside of the casing, the cool air in the inside of the casing being released, as aforesaid. The process also includes releasing a portion of the heating medium from the casing and introducing new heating medium to maintain the vulcanizing temperature within the casing.

In the accompanying drawings I have illustrated a tire casing vulcanizer of a type in general use, the same being modified and equipped to operate in accordance with the present invention.

In the drawings:

Figure 1 is a side elevation of a watch case vulcanizer equipped with a coil and connections for introducing hot water inside of the casings in accordance with the invention.

Figure 2 is a side elevation of a casing mounted with the bull ring and inflating ring.

Figure 3 is a section through the casing and rings on the line 3—3 of Figure 2.

Figure 4 is a section through the vulcanizer, the same being taken on the line 4—4 of Figure 1 looking in the direction of the arrows.

Figure 6 is a side elevation of the inflation ring.

Figure 7 is an edge elevation of the same looking from the right in Figure 6.

Figure 8 is a diametrical section through a watch case vulcanizer equipped for the practice of the invention using steam and air as a means for inflating and heating the casing from within, the vulcanzer jacket being likewise heated by steam which is perfectly mixed with air for the purposes of the invention.

Figure 9 is a section through a similar vulcanizer, likewise using steam and air, but illustrating the application of the bag to the method of the invention.

Figure 5:
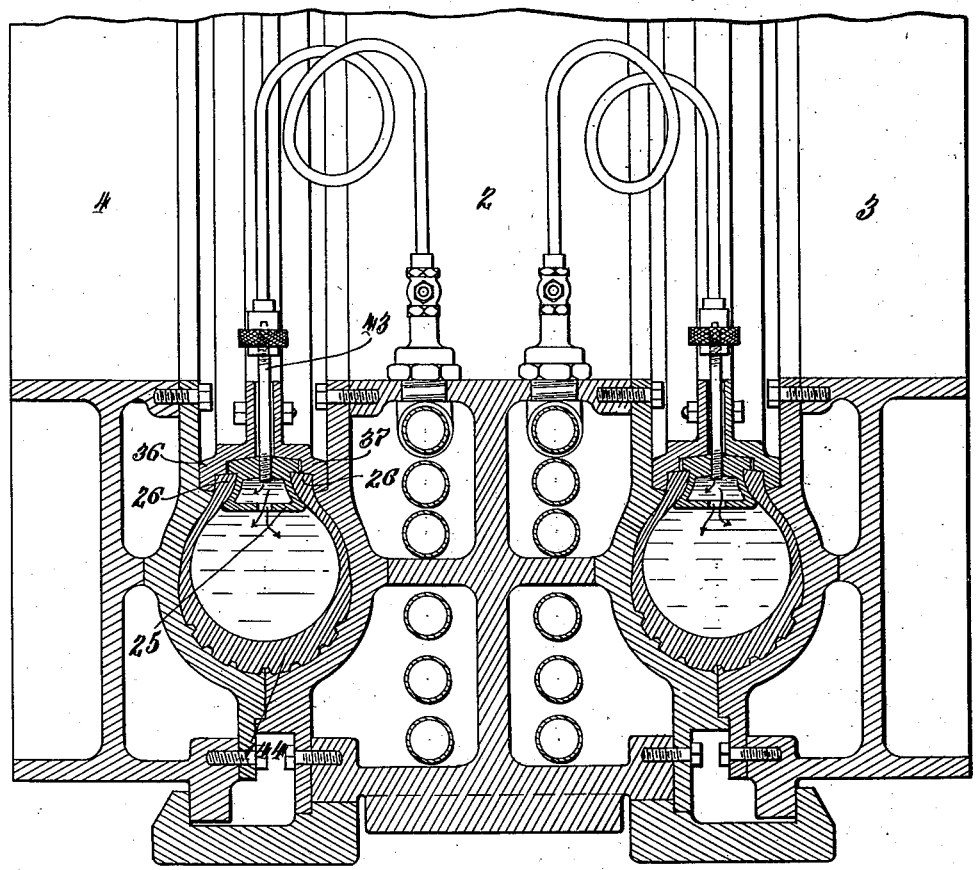
Figure 5 is a section on the line 5—5 of Figure 1.

Referring to the drawings by numerals, each of which is used to indicate the same or similar parts in the different figures, the apparatus illustrated comprises a vulcanizer of a well known type in general use, referred to in the art as a watch case vulcanizer, indicated in a general way by reference character 1, and provided with means, to be more specifically described, for inflating the casing being vulcanized with heating medium at the desired pressure and temperature.

The watch case vulcanizer, as shown, Figures 1 and 4, is adapted to the treatment of two tires or casings at a single operation. It consists of a central annular section 2 and outer annular sections 3 and 4 on each side. The vulcanizer, as aforesaid, contains two tire mold cavities 5 and 6, one-half of each cavity being formed in the central section 2, the other half of the cavity 5 being formed in the section 3 and the other half of the cavity 6 in the section 4. Surrounding the mold cavities the vulcanizer is provided with annular jacket cavities 8, 9, 10, 11, 12, 14, 15 and 16 for the heating medium, usually steam or water, in accordance with the previous practice. The sections 3 and 4 may be held in assembled relation with the central section 2 by means of locking rings 17 and 18, or in any suitable manner, the rings and sections having cooperating cam surfaces meeting at 19 by which the sections are forced together and released as the rings are rotated in accordance with the previous practice in connection with such vulcanizers.

In accordance with the present invention, in the preferred form the casings are closed at the beads so that they may be inflated against the mold and the apparatus may include inflation rings 25 of suitable cross section and diameter to fit between the beads or edges 26 of the casings. These rings may also be provided with annular flanges 27 partially covering the edges of the beads. The inflation rings are preferably made hollow, as shown, and provided with one or more peripheral openings 28 whereby the heating and inflation medium to be introduced inside the casing is released within the casing.

Figure 4 also shows means for exhausting the air from the casings in the form of an air exhaust tube 29 having its intake end 30 near the top of the inside of the casing in the normal position of the mold. This tube, in the form of the invention shown, extends in a radial direction from said intake end 30 toward the center of the mold through the inflation ring 25 and inwardly to the central cavity 32 of the mold, the exhaust end of the tube being, as shown, provided with a pet cock 33 which remains open until the air is exhausted, when it is closed so that molding pressure may be built up inside the casing.

Cooperating with the inflation ring 25 as a means for clamping the beads or edges 26 of the casing and closing the same so that the casing may be made fluid tight and inflated against the mold, is the bull ring 35 formed in two similar but oppositely disposed circular ring sections 36 and 37. The preferred construction and manner of cooperation of the inflation ring and bull ring can be best understood by examination of Figure 3, which shows them in cross section and relatively large scale. The bull ring sections 36 and 37 are preferably formed with inwardly disposed radial flanges 38 through which are passed bolts 39 by which the ring sections are drawn together, as hereinafter described. The sections 36 and 37 are, in the form shown, externally grooved at 40, said grooves registering and admitting the flanges 27 of the inflation ring and the peripheral portion 13 of the ring between the flanges. The sections 36 and 37 are further formed with external surfaces 23 aligned with the inner surfaces 23' of flanges 27 and said sections 36 and 37 are flanged at 41 as to their outer edges, said ring and ring sections are otherwise shaped to enclose the edges or beads 26 of the casing whereby as the ring sections are drawn together the beads 26 are clamped firmly between the inflation ring 25 and the flanges 41 of the bull ring sections.

It will be noted particularly from Figures 2, 5 and 6 that the inflation ring 25 is not only provided with an air exhaust tube 29, but with an inflation nipple 43 leading to the annular ring cavity 44. This nipple is adapted to be connected at its outer end to the supply of heating and inflating medium, whereby the heating and inflating medium is released in the annular cavity 44 inside the ring 15 from which it enters the inside of the casing by way of openings 28.

In accordance with the preferred practice of the invention the casing is first built up of fabric and unvulcanized vulcanizable rubber compound. For this purpose a sheet fabric formed of cords caused to adhere by means of rubber compound, is provided. The casing is preferably built up of this material and rubber compound. The bead is then clamped, as illustrated in Figure 3, the inflation ring 25 being inserted between the beads and the ring sections 36 and 37 being brought into registration with the inflation ring, are drawn together clamping the beads or edges 26, as already described. The unvulcanized casing 144 thus clamped is illustrated in side elevation in Figure 2, as well as in enlarged section in Figure 3.

When the casing is thus clamped and the beads closed so that the casing may be inflated, it is inserted with the bull ring and the inflation ring in the mold cavity as illustrated, Figures 4 and 5. The pins 21 and sockets 22, Figure 4, serve as guides and supports for the rings and casing. The mold sections 3 and 4 are separated from the central mold section 2 to admit the tire and rings between the sections. The mold is then closed upon them, as shown in Figures 4 and 5, the manner of operating the mold illustrated and used in general practice having been already described. The air cock 33 being left open to release the air from the inside of the casing, it is then filled with suitable heating and inflating medium at vulcanizing temperature. The air cock 33 may be closed when the air has been excluded or this or any other suitable connection may be utilized to provide a circulation of heating and inflating medium through the casing from the inlet or supply pipe 65, the pressure being maintained as desired, either by closing this valve or by throttling the heating and inflating medium at this point maintaining the circulation through the casing and at the same time maintaining a fluid pressure therein. This step is regarded as a feature of the process.

The apparatus illustrated in Figures 1, 4 and 5 is particularly adapted to the use of water as a heating and inflating medium. It being understood that the mold jackets 8, 9, 10, 11, 12, 14, 15 and 16 are heated in any suitable manner, as by means of steam or hot water to the desired vulcanizing temperature, the illustration includes coil 45 in the jackets connected by means of pipe 46 with any suitable supply of water under pressure. In this way the water in the coil is heated to the exact temperature of the jackets prior to the insertion of the unvulcanized tire in the mold. When the tire has been clamped as to the beads or edges and inserted in the mold, as aforesaid, the coil 45 is then connected to the nipples 43, the coil being connected for this purpose to fittings 46 by way of flexible tubing 47, the passage of the water from the coil to the nipples 43 being further controlled by a valve 48. The air release pet cock 33 being opened and the connections 46, 43 being made and the pet cock 48 being likewise opened, the air in the casing is displaced by hot water from the coil raised to the temperature of the water in the jackets. As soon as the air in the casing is all ejected, hot water will issue from the pet cock 33 and when water at or near the desired temperture of vulcanization is blown out from, or flows from the pet cocks 33, the flow may be stopped or checked. The apparatus is then maintained at the predetermined temperature of vulcanization for the usual period of vulcanization, when the vulcanized casings are removed in accordance with the regular practice. To avoid loss or heat due to the escape of the water used in the inside of the casings, this may be returned to a suitable reservoir.

Figure 10:
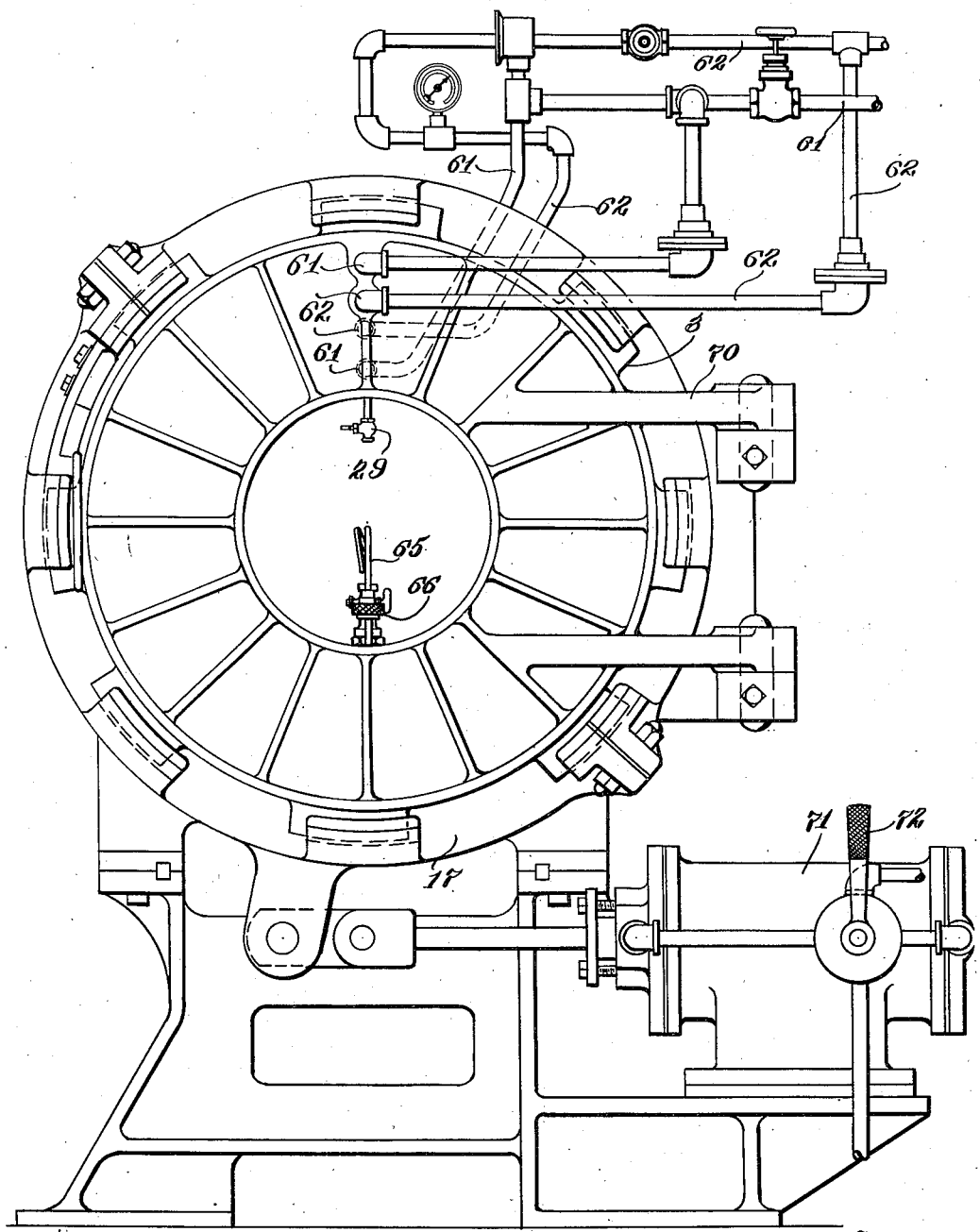
Figure 10 is a side elevation of a vulcanizer of the type shown in Figures 8 and 9.

In Figures 8, 9 and 10 I have illustrated a slightly modified construction adapted to the practice of the method in a somewhat different manner. In the construction, Figures 8, 9 and 10, instead of using the coils 45 by which water under the desired pressure is introduced into the casings at the temperature of vulcanization, I heat the mold cavity 59 by means of steam or other hot gas introduced into the jackets 60 by way of a steam pipe 61, or in any suitable manner. This supply of steam or other hot gas which would not, if live steam at vulcanizing temperature is used, have the desired pressure for molding, is first admitted and then raised to the pressure necessary to inflate the casing against the mold by the introduction of air or other diluent gas under pressure by way of the air pipe 62. The necessary temperature and pressure are thus attained and maintained at will, said temperature and pressures being indicated by gages 81 and 82. The inflation ring 25 and bull ring 35 are substantially the same as previously described, but this construction differs slightly from that previously described in that instead of the use of the coil the jacket 60 is connected to the cavity 44 within the inflation ring and hence to the inside of the casing by perforations 28, the said connection being made by means of steam and air pipe or tube 65 connected to the jacket by a suitable fitting 66 and to the inflation ring nipple 43 by a suitable removable fitting 67.

Figure 10 is an external view which may apply to any of the molds illustrated except for the arrangement of the steam and air pipes, which is particularly adapted to the method last described.

The watch case vulcanizer has been quite fully discussed. In addition to the features referred to Figure 10 shows hinges 70 on which the end sections corresponding to 3 and 4 in Figure 4 are supported. In Figure 10 there is also shown a steam or hydraulic motor 71 controlled by a throttle lever 72 by which the locking ring 17 is operated to lock and unlock the vulcanizer sections. The steam and air pipes 61 and 62 are also shown in an arrangement which is regarded as feasible for the purposes of the invention.

Figure 9 shows a bag 85 employed in connection with the air and steam method just described. In this instance the inflation ring is omitted, the bag being provided with an air exhaust tube 86, used in the same manner as is exhaust tube 29, and an inflation nipple 87 joined to flexible tube 88 by fitting 89.

I have thus described specifically and in detail the preferred and secondary form of my invention in order that the nature and operation of same may be clearly understood, however, the specific terms herein are used descriptively rather than in a limiting sense, the scope of the invention being defined in the claims.

What I claim as new and desire to secure by Letters Patent is:

1. In an apparatus for vulcanizing tire casings, a jacketed mold to enclose the casing from without, a coil with means for supplying fluid thereto under pressure, the coil being inside the mold jacket, and connections from the heating coil for introducing fluid from the coil within the casing, whereby the casing is heated from within to vulcanizing temperature and is, at the same time, inflated against the mold.

2. The combination with a jacketed mold and means for supplying fluid at vulcanizing temperatures to the mold jackets, of an inflation ring to fit between the beads of a tire casing to be vulcanized and a bull ring formed in sections contacting the outsides of the respective beads, means for drawing the sections together to clamp the beads against the inflation ring, the mold being formed to receive and cooperate with said ring sections, and means for introducing fluid under pressure at vulcanizing temperatures into the casing through said inflation ring, said means comprising a coil in the mold jacket.

Signed by me at Baltimore, Maryland, this 19th day of May, 1927.

EDWARD FETTER.